(No Model.)

P. MILES.
BOTTLE STOPPER.

No. 421,957. Patented Feb. 25, 1890.

WITNESSES:
Gustave Dieterich
T. F. Bourne

INVENTOR
Purches Miles
BY Briesen, Steele & Knauth
ATTORNEYS.

UNITED STATES PATENT OFFICE.

PURCHES MILES, OF BROOKLYN, NEW YORK, ASSIGNOR TO HENRY W. PUTNAM, OF BENNINGTON, VERMONT.

BOTTLE-STOPPER.

SPECIFICATION forming part of Letters Patent No. 421,957, dated February 25, 1890.

Application filed June 12, 1889. Serial No. 313,950. (No model.)

*To all whom it may concern:*

Be it known that I, PURCHES MILES, a resident of the city of Brooklyn, Kings county, New York, have invented certain new and useful Improvements in Bottle-Stoppers, of which the following is a specification.

The object of my invention is to provide a swinging handle for a bottle or jar stopper.

The invention consists in the combination of a bottle or jar stopper with a handle swiveled to said stopper at its upper part, and adapted to be swung above said stopper, so as to act as a suspension device for the bottle.

The invention further consists in the details of improvement and the combinations of parts, that will be more fully hereinafter set forth.

Reference is to be had to the accompanying drawings, forming part of this specification, wherein—

Figure 1:
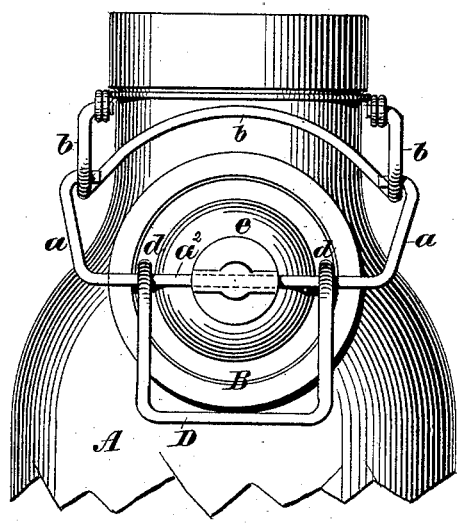
Figure 3:
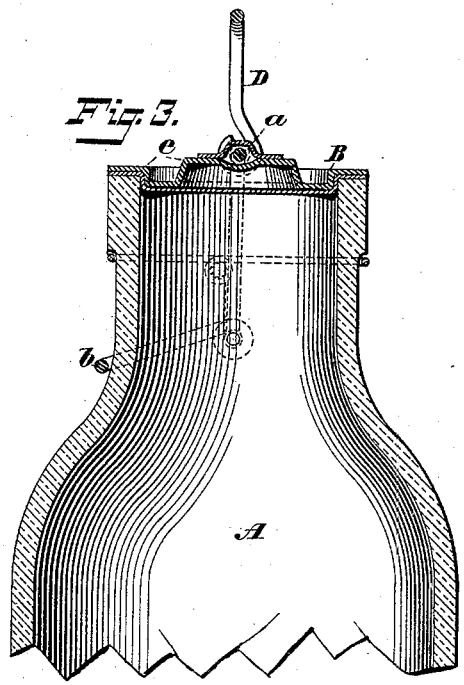
Figure 2:
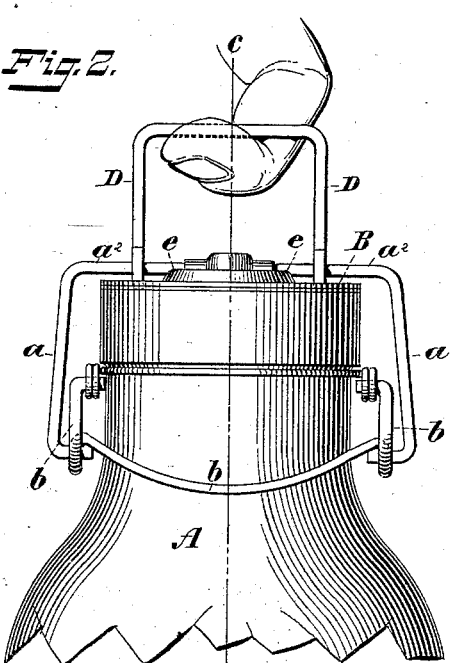
Figure 4:
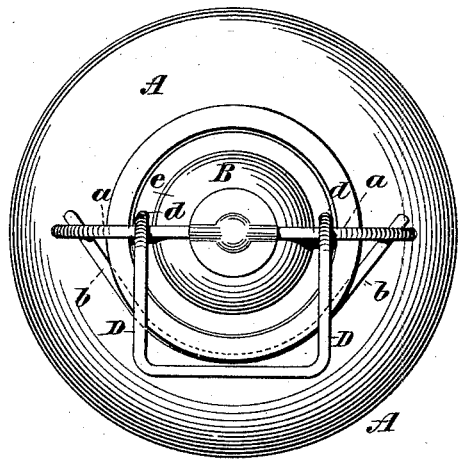

Figure 1 is a side view of the upper portion of a bottle and its stopper, the stopper being shown swung down from the neck of the bottle, disclosing my improved handle connected with the stopper. Fig. 2 is a similar view showing the stopper in position on the neck of the bottle and my improved handle swung up into position for supporting the bottle. Fig. 3 is a vertical transverse section on the plane of the line $c\ c$, Fig. 2; and Fig. 4 is a plan view of the bottle and its stopper, showing my improved handle in the position it assumes when not in use.

The letter A indicates a bottle or jar, which may be of any suitable construction, and B is its stopper or cover. The stopper B is shown carried by a bail $a$, that extends across its top, and that is pivoted at its ends to a lever $b$, suitably hinged to the neck of the bottle. This form of bottle-stopper is what is known in the market as the "Lightning Bottle-Stopper;" but any other desired construction of stopper may be used in connection with my improvement, if desired.

D is my improved handle for supporting the bottle. It is bail-shaped and is pivotally connected with the stopper. It is shown swiveled to the horizontal upper part $a^2$ of the bail $a$, so that it may be swung up into the position shown in Fig. 2, or may assume the positions shown in Figs. 1 and 4.

The ends $d$ of the handle D are preferably placed near the elevated part $e$ of the stopper, to prevent the handle D from sliding on the bail $a$.

By having the handle D swiveled on the horizontal part $a^2$ of the bail $a$ said handle will lie flat when not in use, as shown in Fig. 4, and when the bottle is lifted by the handle the weight of the bottle is sustained by the bail $a$ and lever $b$. When the stopper B hangs down, as shown in Fig. 1, the pivoted handle D also hangs down along the side of the bottle, whereby it is kept out of the way of other objects.

The handle D is not only useful for carrying the bottle by, but the bottle may be hung up in cool places by this handle, and may also by it be withdrawn from chests and delivery-wagons with facility. The handle may also be used to place the stopper upon the neck of the bottle or to withdraw it from the bottle in opening the same.

Having now described my invention, what I claim is—

1. The stopper B and its supporting-bail $a$ in combination with the handle D, swiveled to said bail $a$ on the horizontal part of said bail, and with the lever $b$, carrying the bail $a$, and pivotally connected with the neck of the bottle, substantially as described.

2. The stopper B, having elevation $e$, and the pivoted bail $a$, engaging the stopper by the elevation $e$, combined with the handle D, which is pivotally connected with said bail near said elevation, and with the lever $b$, to which the bail $a$ is pivoted, said lever being pivotally connected with the bottle-neck, substantially as described.

PURCHES MILES.

Witnesses:
T. F. BOURNE,
JOHN M. SPEER.